Figure 1:
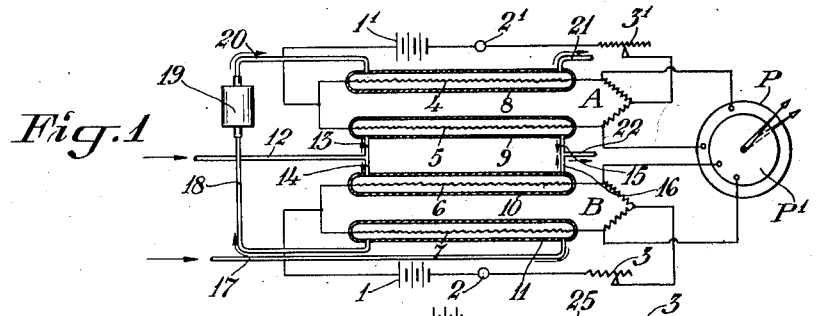

March 17, 1925.  1,530,202
O. RODHE
CONTINUOUSLY OPERATING GAS ANALYZING APPARATUS
Filed Dec. 15, 1922

Inventor
Olof Rodhe,
By Knight Bros.
Attys.

Patented Mar. 17, 1925.

1,530,202

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION OF SWEDEN.

CONTINUOUSLY-OPERATING GAS-ANALYZING APPARATUS.

Application filed December 15, 1922. Serial No. 607,205.

*To all whom it may concern:*

Be it known that I, OLOF RODHE, a subject of the King of Sweden, residing at Odengatan 54 A, Stockholm, Sweden, have invented certain new and useful Improvements in Continuously-Operating Gas-Analyzing Apparatus, of which the following is a specification.

Continuously-operating gas analyzing apparatuses for determining for instance carbon dioxide in flue gases are previously known, said apparatuses being based on the fact that carbon dioxide has a thermal conductivity different from that of the other constituents of the flue gases—carbon monoxide, hydrocarbon, oxygen and nitrogen. Such apparatuses may consist of two identical metal wires for instance of platinum, enclosed in separate cells and connected into an electrical circuit so as to each form an arm of a Wheatstone bridge. If an electrical current passes through said circuit, the wires will be heated and thus give off heat to the surrounding air or gas and to the walls of the cells. Now, if the two cells are passed by gases of different thermal conductivity, the quantities of heat given off by the wires to the gases will be different, the one of the wires being maintained at a higher temperature than the other. The difference of temperature will cause a difference in the resistance of the two wires, causing a deflection of a galvanometer or the like inserted in the circuit, the magnitude of the said deflection being dependent on the difference between the thermal conductivities of the two gases.

The present invention refers to continuously-operating gas analyzing apparatuses of the type described or of other types, in which the analyses take place so to say in every minute and in which the percentage of two or more gas constituents of a gas mixture or of different gas mixtures are determined by two or more continuously running analyses, the invention being essentially characterized by the fact that in such an apparatus at least one of the gas constituents is always included in both or in all of the analyses.

If in such an apparatus the percentage of each gas constituent is recorded by a separate stylus and all the records are recorded on one and the same chart, the number of possible, direct readings will be greater than the number of analyses performed.

In an apparatus of the type described which is especially adapted for the analysis of flue gases, the gas constituent included in all the analyses will consist either of carbon dioxide or unburnt gases, thus making it possible, as will be described hereinafter, on the chart common to all the styli directly to read off three dates of the gas mixture analyzed, viz, the percentage of carbon dioxide, the percentage of unburnt gases and the percentage of carbon dioxide plus unburnt gases.

Figure 2:
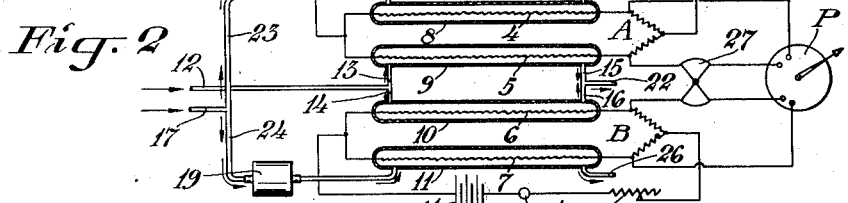
Figure 3:
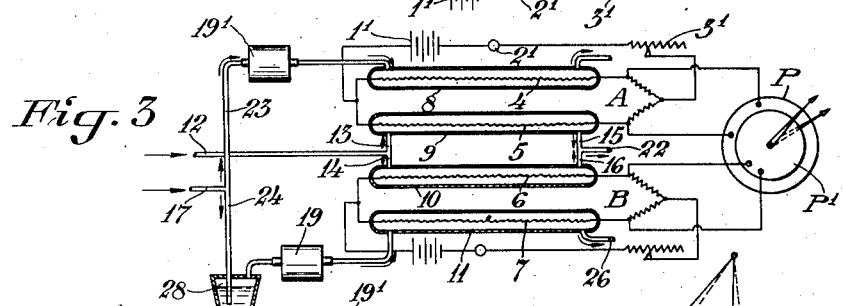
Figure 4:
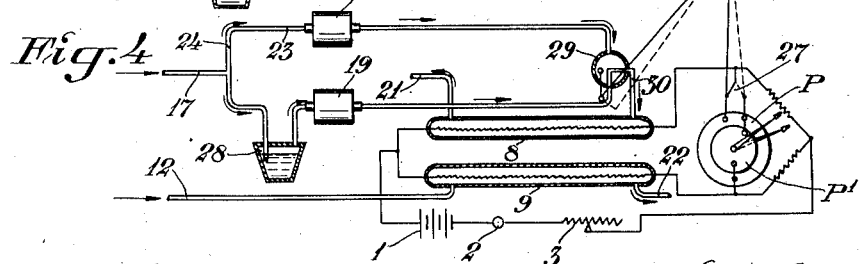
Figure 5:
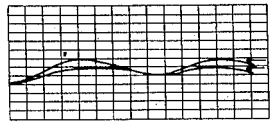
Figure 6:
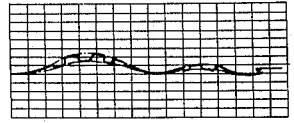
Figure 7:
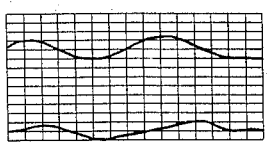

The invention will now be more fully described with reference to the accompanying drawings showing some embodiments of the invention especially adapted for analyses of flue gases. Fig. 1 is a diagrammatic view of a continuously-operating gas analyzing apparatus provided with two indicating or recording devices which latter record the results on a common chart. Fig. 2 is a diagrammatic view of another embodiment of the apparatus with only one recording- or indicating device. Fig. 3 is a diagrammatic view of a third embodiment provided with two recording- or indicating devices. Fig. 4 shows a modification of the embodiment shown in Fig. 3 provided with two recording- or indicating devices operating alternatively. Figs. 5–7 show different diagrams obtained in the apparatuses shown in Figs. 1 to 4 inclusive.

Referring to Fig. 1, A and B are two circuits arranged as Wheatstone bridges and supplied with current from the batteries 1 and $1^1$ respectively through the ammeters 2 and $2^1$ respectively and the adjustable resistances 3 and $3^1$ respectively. Inserted in each arm of the circuits A and B are identical resistance wires or spirals 4, 5 and 6, 7 respectively, enclosed in hollow cells or pipes 8, 9 and 10, 11 respectively, through which the gas mixtures to be analyzed and a neutral gas such as air used for comparison may pass. Inserted in the circuit A is a galvanometer P and in the circuit B another galvanometer $P^1$, said galvanometers being either indicating or recording or they may be indicating as well as recording. A separate recording mechanism independent of the galvanometers may also be used.

The gas of comparision, such as air enters through the pipe 12 which is branched in two pipes 13, 14 leading to the cells 9 and 10 respectively, from which the air escapes into the atmosphere through the outlet pipes 15 and 16 respectively, the cells 9 and 10 thus being connected in parallel. The flue gases may enter through the pipe 17, pass through the cell 11, whence they flow through the pipe 18 into an electrical furnace 19 filled by an oxidizing agent, for instance iron oxide or copper oxide, in which furnace the proportion in the flue gases of unburnt gases—carbon monoxide and hydrocarbon—is connected into carbon dioxide. From the furnace the oxidized flue gases will pass through the pipe 20 into the cell 8, from which the gases escape into the atmosphere through the pipe 21. Thus the cells 8 and 11 are coupled in series. By inserting moisture regulators of known type in the pipes 12 and 17 as well as in the pipe 20, the gas mixture to be analyzed and the air may be saturated with humidity, or water may be separated from a supersaturated gas mixture. Simultaneously, the gases and the air are caused to assume the same constant temperature and degree of humidity.

The mode of operation is as follows:

The resistance wires 4, 5 and 6, 7 respectively of the circuits A and B respectively are heated by current from the batteries 1, 1¹ respectively. The wires give off heat to the walls of the cells 8, 9, 10, 11 through the intermediary of the gas- or air current flowing through the cells. The difference in composition between the currents of gas and air passing through the cells 8, 9 and 10, 11 respectively causes a difference in temperature between the wires and consequently a difference between the resistance of the wires, causing a deflection of the galvanometers P and P¹ or a recording on the corresponding chart or charts.

It may be pointed out that in the cell 11 the percentage of carbon monoxide and hydrocarbon does not affect the result of the analysis, said gases having the same thermal conductivity as the gas used for comparison, such gas consisting in the present case of air. The galvanometers are preferably graduated so that they will give a direct reading of the percentage of the analyzed constituent or constituents of the gas mixture, in the present case carbon dioxide and unburnt gases (carbon monoxide plus hydrocarbon).

A diagram taken with this apparatus is shown in Fig. 5. The percentage of carbon dioxide being included in both analyses, the position of the one stylus will always be dependent on that of the other stylus, that is to say, the curve representing the sum of carbon dioxide and unburnt gases will be drawn so to say with the curve of carbon dioxide as a zero-line. In the diagram, the lower curve represents the percentage of carbon dioxide and the upper curve the percentage of carbon dioxide plus unburnt gases. In cases where the two curves run together there has, consequently, been no content of unburnt gases present in the flue gases. By arranging the recording in this way it will be possible directly to read off three data concerning the gas mixture analyzed, viz, the percentage of carbon dioxide, the percentage of carbon dioxide plus unburnt gases and the percentage of unburnt gases, said last named percentage being represented by the difference between the two curves.

The apparatus shown in Fig. 2 differs in several respects from that of Fig. 1. The two bridge circuits A and B and the cells 8, 9, 10 and 11 with the resistance wires or spirals 4, 5, 6 and 7 respectively are the same as before. The air enters through the pipe 12, passes through the cells 9, 10 connected in parallel, and escapes through the pipe 22. The flue gases enter through the pipe 17, pass through the branch pipes 23, 24 into the cells 8, 11 connected in parallel, through which they pass and from which they escape into the atmosphere through the pipes 25 and 26 respectively. Inserted in front of the cell 11 is an electrical furnace 19, and connected in the circuits A and B is a galvanometer P common to both, which may be connected by a switch 27 alternately to the one or the other of the circuits. Said switch may be operated manually or automatically at a given periodicity.

The mode of operating will be clearly understood by a comparison with Fig. 1. In this case, too, the flue gases are tested partly with respect to their contents of carbon dioxide, and partly in regard to carbon dioxide plus unburnt gases.

A diagram taken with this apparatus is shown in Fig. 6. It is evident that two curves will be obtained on account of the intermittent recording or indicating operation, and that the recording stylus will describe a broken line approximately the same as the line drawn in full on the chart. By varying the periodicity of the switch 27, shorter or longer continuous portions of the two curves can be obtained.

The apparatus shown in Fig. 2 may of course be combined with the apparatus shown in Fig. 1, that is to say, the analyzing cells may be connected in series also in the apparatus last described.

Fig. 3 shows a third embodiment of the apparatus differing from that of Fig. 2 by an absorption vessel 28 for carbon dioxide containing for instance potassium hydrate, being inserted in front of the oxidizing furnace 19 inserted in the conduit 24, an oxidizing furnace 19¹ being inserted in the conduit 23, and further by the arrangement of two galvanometers P, P¹, that is one galvanometer in each of the circuits A, B. In the absorbing vessel 28, the carbon dioxide of the flue gases is absorbed, and thus the deflection of the galvanometer $P^1$ will only be dependent on the carbon dioxide formed by the oxidation in the electrical furnace 19 of the unburnt gases present in the flue gases. The unburnt gases present in the flue gases are oxidized in the oxidizing furnace $19^1$. Thus the galvanometer P will indicate or record the percentage of the sum of carbon dioxide and unburnt gases, while the galvanometer $P^1$ will only indicate or record the percentage of unburnt gases—carbon monoxide plus hydrocarbon.

A diagram obtained with this apparatus is shown in Fig. 7, the upper curve representing the percentage of carbon dioxide plus the percentage of unburnt gases, while the lower curve represents the percentage of unburnt gases, the common gas constituent being in this case unburnt gases. It is evident that this diagram will also make it possible to read off said three data of the flue gases, viz, unburnt gases, the sum of carbon dioxide and unburnt gases and carbon dioxide, represented by the difference between the two curves.

The apparatus shown in Fig. 4 represents a modification of the apparatus shown in Fig. 3. The number of cells is limited to two, such cells being denoted by 8 and 9, one of which is passed by a gas used for comparison, such as air, which enters through the pipe 12 and escapes through the pipe 22. The flue gases are sucked in through the pipe 17 and pass either through the pipe 23, the oxidizing furnace $19^1$, the two-way cock 29 and the pipe 30 directly to the cell 8, or through the pipe 24, the absorbing vessel 28, in which the carbon dioxide is absorbed in known manner, the oxidizing furnace 19, the two-way cock 29 and the pipe 30 into the same cell 8. The gases escape from the cell 8 through the pipe 21. The way to be passed by the gases is determined by the position of the cock 29, said valve being positively connected in any suitable manner (for instance as is diagrammatically shown in the figure) to an electrical switch 27 which, according to the position thereof, will alternately connect the galvanometers P and $P^1$ into the circuit. The cock 29 and the switch 27 may be operated either manually or automatically at a given constant periodicity. The circuit is led by the battery 1 through the ammeter 2 and the adjustable resistance 3.

The mode of operation of the apparatus should be readily understood by comparing the apparatus with those above described. As in the preceding case, the galvanometer P will record or indicate the percentage of carbon dioxide + unburnt gases and the galvanometer $P^1$ the percentage of unburnt gases, the common constituent consisting of unburnt gases in the present case, too. By positively connecting the two galvanometers in known manner, the deflection of the one galvanometer may be made dependent of that of the other. By the provision of suitable locking means the styli or pointers may be locked in their positions during the period in which they are not influenced by the current. By such an arrangement, curves similar to those of Figs. 5 and 7 may be obtained with this apparatus too.

In all apparatuses described hereinbefore, the adjustable resistance serves to set the galvanometers, that is to say to compensate for variations that may occur in the potential of the battery.

While apparatuses for two analyses have been described hereinbefore, the invention is in no way restricted to the said arrangement, but comprises also gas analyzing apparatuses for a greater number of analyses, in which always one of the gas constituents is included in all the analyses. In the example selected, a test of flue gases may be conceived with respect to carbon dioxide, unburnt gases and oxygen.

What I claim as new and desire to secure by Letters Patent of the United States of America is:—

1. In a gas analyzing apparatus, means for continuously determining the percentage of one constituent of a gas mixture and means for continuously determining the percentage of said constituent plus another constituent of said gas mixture.

2. In a gas analyzing apparatus, means for continuously determining the percentage of several constituents of a gas mixture by a corresponding number of continuously running analyses, one of the gas constituents being always included in all the analyses.

3. In a gas analyzing apparatus, means for continuously determining the precentage of one constituent of a gas mixture, means for continuously determining the percentage of said constituent plus another constituent of said gas mixture, a separate stylus for recording the results of each of said two continuously running analyses and a chart on which said styli record and common to both the styli.

4. In a gas analyzing apparatus, means for continuously determining the percentage of several constituents of a gas mixture by a corresponding number of continuously running analyses, one of the gas constituents being always included in all the analyses, a separate stylus for recording the result of each of said analyses and a chart on which said styli record and common to all the styli.

5. In an apparatus for the analysis of flue gases, means for continuously determining the percentage of carbon dioxide of the flue gases, means for continuously determining the percentage of carbon dioxide plus unburnt gases, carbon monoxide and hydrocarbon of the flue gases, a separate stylus for recording the results of each of said two continuously running analyses and a chart on which said styli record and common to both the styli.

6. In an apparatus for the analysis of flue gases, means for continuously determining the percentage of several constituents of the flue gases by a corresponding number of continuously running analyses, the proportion of carbon dioxide present in the flue gases being included in all of the analyses.

In testimony whereof I affix my signature in presence of two witnesses.

OLOF RODHE.

Witnesses:
 ERIC SOLGER.
 K. SJÖHOHN.